US007129454B2

(12) United States Patent  
O'Connell et al.

(10) Patent No.: US 7,129,454 B2  
(45) Date of Patent: Oct. 31, 2006

(54) PRECISION OPTICAL INTRACELLULAR NEAR FIELD IMAGING/SPECTROSCOPY TECHNOLOGY

(75) Inventors: Dan O'Connell, Kihei, HI (US); Caitlin O'Connell-Rodwell, Stanford, CA (US)

(73) Assignee: Nanopoint, Inc., Honolulu, HI (US)

( * ) Notice: Subject to any disclaimer, the term of this patent is extended or adjusted under 35 U.S.C. 154(b) by 485 days.

(21) Appl. No.: 10/290,528

(22) Filed: Nov. 8, 2002

(65) Prior Publication Data

US 2006/0118696 A1 Jun. 8, 2006

Related U.S. Application Data

(60) Provisional application No. 60/331,101, filed on Nov. 8, 2001.

(51) Int. Cl.  
*G02B 7/04* (2006.01)

(52) U.S. Cl. .................. 250/201.3; 250/208.1

(58) Field of Classification Search ............. 250/201.3, 250/208.1, 216, 306, 307, 370.08; 359/368, 359/379, 351; 607/33, 62, 6  
See application file for complete search history.

(56) References Cited

U.S. PATENT DOCUMENTS

| | | | | |
|---|---|---|---|---|
| 5,004,307 A * | 4/1991 | Kino et al. | ............... | 359/356 |
| 5,939,709 A * | 8/1999 | Ghislain et al. | ........... | 250/216 |
| 6,208,886 B1 | 3/2001 | Alfano et al. | | |
| 6,775,009 B1 * | 8/2004 | Hill | ........................... | 356/516 |
| 6,818,907 B1 | 11/2004 | Stark | | |
| 2003/0215844 A1 | 11/2003 | Chapsky et al. | | |

OTHER PUBLICATIONS

Tang et al.; *Consideration and control of writing conditions with a near-field APSIL probe*; Proceedings of International Symposium on Optical Memory and Optical Data Storage/2002; ISBN 0-7803-7379-0; Published:2002; pp. 243-245.

Tom D. Milster et al.; *Super-Resolution by Combination of a Solid Immersion lens and Aperture*; The Japan Society of Applied Physics, Part 1, No. 3B; Mar. 2001.

Bert Hecht et al.; *Scanning near-field optical microscopy with aperture probes; Fundamentals and applications*; Special Topic: Near-Field Microscopy and Spectroscopy; Journal of Chemical Physics, vol. 112, No. 18; May 8, 2000.

Eric Betzig and Robert J. Chichester; *Single Molecules Observed by Near-Field Scanning Optical Microscopy*; Science, New Series, vol. 262, No. 5138; Nov. 26, 1993; pp. 1422-1425.

S.M. Mansfield and G. S. Kino; *Solid Immersion Microscope*; Appl. Phys. Lett., vol. 57, No. 24; Dec. 10, 1990.

* cited by examiner

*Primary Examiner*—Que T. Le  
(74) *Attorney, Agent, or Firm*—James Creighton Wray

(57) ABSTRACT

A Precision Optical Intracellular Near Field Imaging/Spectroscopy Technology (POINT/NANOPOINT) is a high-resolution instrument for analyzing and comparing molecular characteristics of cells. A nanosensor array is provided which is capable of imaging inner regions of living cells without destroying its natural environment and providing new information about molecular makeup of cells. The POINT probe collects data from high-resolution imagery, providing an imaging tool for investigating cells at subcellular and molecular levels. Data are then incorporated into a signature facilitating molecular analysis of diseases. The POINT probe non-invasively penetrates cell membranes to image insides of intact cells allowing the POINT probe to collect data without destroying cell structures. The probe provides cellular imaging to enable the viewing of both imaging and spectroscopy of internal regions of cells. The POINT system may be attached to existing microscopes to achieve a very high resolution.

48 Claims, 3 Drawing Sheets

Oceanit's "Cell Tray" to hold individual cells stationary in a precise array

Near-Field probe technique using probe at the base of a SIL

Diagram of multiple probes fabricated in combination with a cell well array

Incident beams from conventional microscope

PRECISION OPTICAL INTRACELLULAR NEAR FIELD IMAGING/SPECTROSCOPY TECHNOLOGY

This application claims the benefit of U.S. Provisional Application No. 60/331,101, filed Nov. 8, 2001.

BACKGROUND OF THE INVENTION

Conventional Scanning Near-Field Optical Microscope (SNOM or NSOM) probes are presently designed to move over the surface of the object being measured, maintaining a constant probe distance from a surface at the nanometer scale while scanning across the surface to obtain nanometer scale resolution images. Scanning near-field microscopy (SNOM) is an optical technique capable of resolving beyond the diffraction limit, where resolutions in the 20 nm range have been demonstrated. The SNOM technology has been applied to cells and to plasma membranes. The high-resolution imagery revealed detail of the cytoskeletal actin not obtainable by any other methods.

SNOM has achieved nano-resolution scales where single molecules have been studied. Near-field techniques circumvent the diffraction limit imposed on conventional light microscopes to obtain sub-wavelength spatial resolution. Currently SNOM instruments are not capable of penetrating into a living cell or imaging intracellular regions.

Needs exist for a system capable of collecting data from high-resolution imagery providing a unique imaging tool for the investigation of cells at the sub-cellular and molecular level.

SUMMARY OF THE INVENTION

SNOM has demonstrated the ability to image individual proteins with 100 nm resolution. The most exciting recent development of SNOM technology is the ability to study single molecules and macromolecules such as DNA. The present invention, Precision Optical Intracellular Near Field Imaging/Spectroscopy Technology (POINT or NANOPOINT), overcomes the limitations fostered under conventional methods.

POINT is a novel high-resolution instrument for analyzing and comparing molecular characteristics of cells. Currently confocal microscopes, MRI and ultrasound cannot image to a 50 nm resolution and the use of electron microscopes destroys the cells. The POINT system is a nanosensor array capable of imaging inner regions of living cells without destroying its natural environment. The system uniquely provides new information about the molecular makeup of a cell. The system works well with Applicant's "Cell Tray" invention described in co-pending Provisional Application Ser. No. 60/421,566 which is incorporated herein by reference in its entirety.

The POINT probe collects data from high-resolution imagery, providing a unique imaging tool for the investigation of cells at the sub-cellular and molecular level. These data are incorporated into a signature, which facilitates the molecular analysis of diseases. The current invention has more sensitivity and resolving power than is presently available in microscopy and provides a more detailed understanding of the molecular processes.

The POINT probe penetrates the cell membrane with a SNOM probe to image the inside of intact cells allowing the POINT probe to collect data from intact cells. This embodiment overcomes the technical difficulties of modifying an existing scanning near-field microscope. The POINT probe greatly improves the imaging of intact cells at the sub-cellular and molecular level without destroying the cell structure.

The POINT probe is a novel high-resolution imaging technique for analyzing the internal regions of, yet not limited to, intact human and other cells. The POINT probe is an innovative adaptation of Scanning Near-Field Optical Microscopy (SNOM or NSOM) where the SNOM probe is modified to penetrate intact cells and view these inner regions. Conventional SNOM merely performs surface topography measurements.

The POINT probe characterizes and investigates intact cells with sub-cellular and molecular structures within the context of intact cells. In another embodiment, the POINT probe acts also as an early warning tool facilitating early treatment and eradication of diseased cells.

The POINT probe extends the current capability of cellular imaging to enable the viewing of both imaging and spectroscopy of the internal regions of cells. Confocal microscopes are able to view inner regions of cells due to the translucent nature of a cell membrane and cytoplasm to high resolutions but are limited by diffraction to 1-micron cross-section. Near-field techniques are able to achieve sub-micron resolution down to tens of nanometers. However, current NSOM methods do not allow for intra-cellular imaging and spectroscopy investigations.

The POINT probe allows researchers to gather a richer data set, than that achieved by using conventional methods, from sub-cellular and molecular structures within the context of intact cells. The preferred embodiment improves the imaging of intact cells at the sub-cellular and molecular level without destroying the cell structure. This ability has optimal impact on the biological and medical community to be able to obtain information never before possible.

One of the major benefits of this system is it costs significantly less than current near-field systems and function with greater capability. The POINT system may be produced as an attachment, so that it can be added to an already existing microscope setup. This means ordinary microscopes, found in most biological and medical labs, to achieve a very high resolution.

These and further and other objects and features of the invention are apparent in the disclosure, which includes the above and ongoing written specification, with the claims and the drawings.

DETAILED DESCRIPTION OF PREFERRED EMBODIMENTS

The preferred embodiment is a method for collecting image data on macro-molecules from intact cells by adapting existing SNOM technology. Although there is some documentation on the use of SNOM on biological samples, the technique has not been perfected. This invention enables intact cells to be penetrated and sub-cellular components to be viewed with an adapted SNOM probe, providing new information about the architecture within a cell and it's molecular composition.

Most molecular studies are conducted outside of the cell and the ability to view molecular processes within intact cells provides more and better information. The non-invasive probe optimally impacts the field of cell biology, as SNOM technology has not yet been applied to intact, hydrated cells.

Figure 1:
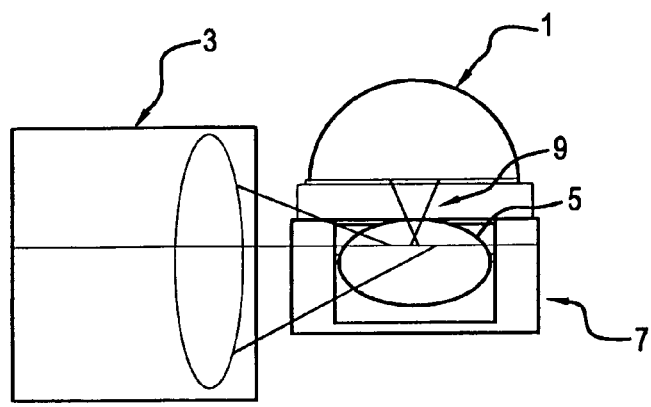
FIG. 1 is a schematic diagram of the preferred embodiment.

FIG. 1 shows the basic configuration of POINT with the relative orientation of the modified near-field microscope 1, the POINT probe 9, and the confocal microscope 3 with respect to the cell 5 and the etched cell wall 7. The subsystems supporting POINT illuminators for the probe and for image processing are described in detail below.

Figure 2:
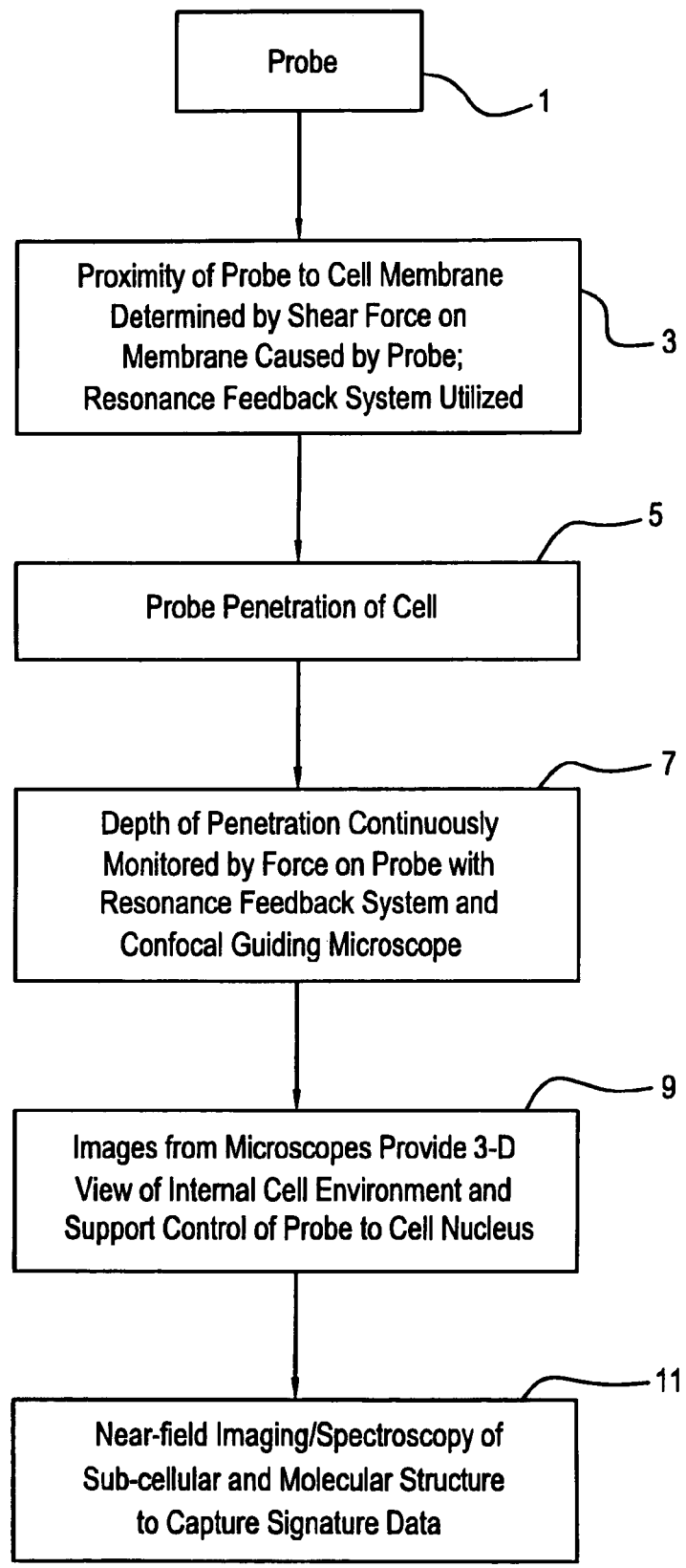
FIG. 2 is a schematic diagram of the process flow for POINT.

FIG. 2 is the process flow for POINT 1. It describes the process steps, controls, and imaging operations to capture signature data of the cell. The proximity of the probe to a cell membrane is determined 3 by shear force on the membrane caused by the probe. During this process, the resonance feedback system is utilized.

Next the probe penetrates the cell 5. The depth of the penetration is continuously monitored 7 by force on the probe. The penetration is monitored with the resonance feedback system and confocal guiding microscope. Images from microscopes 9 provide 3-D views of the internal cell environment and support control of the probe to cell nucleus. The near-field imaging/spectroscopy of sub-cellular and molecular structure 11 is used to capture signature data.

Figure 3A:
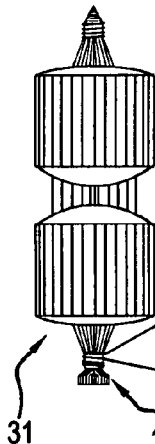
FIG. 3A shows an solid immersion lens (SIL) microscope configuration.
Figure 3B:
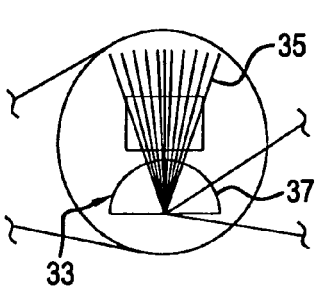
FIG. 3B is an enlarged view of a solid immersion lens.
Figure 3C:
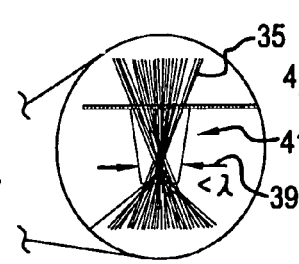
FIG. 3C is an enlarged view of the near-field aperture probe.
Figure 3D:
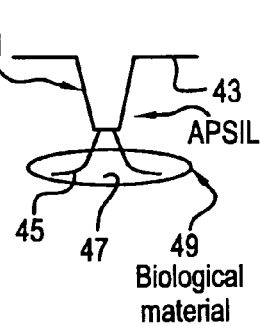
FIG. 3D is a near-field illumination of a cell.

FIGS. 3A–3D show a solid immersion lens with near-field aperture (APSIL). FIG. 3A is a microscope/SIL combination 31. FIG. 3B is an enlarged view of the SIL 33, illustrating the incoming rays 35 normal to the convex side 37 of the SIL 33. FIG. 3C is an enlarged view of the near-field aperture probe 41. A computer model shows light rays 35 focusing halfway 39 through the near-field probe 41 placed at the base 43 of the SIL 33. FIG. 3D shows the near-field illumination 45 of a cell 47 in biological material 49.

Figure 4A:
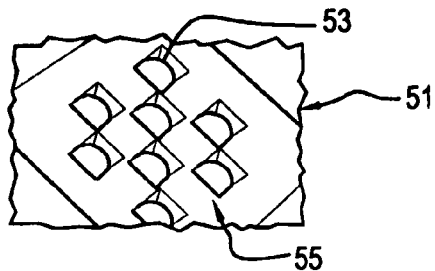
FIG. 4A shows Oceanit's "Cell Tray" holding individual cells stationary in a precise array.
Figure 4B:
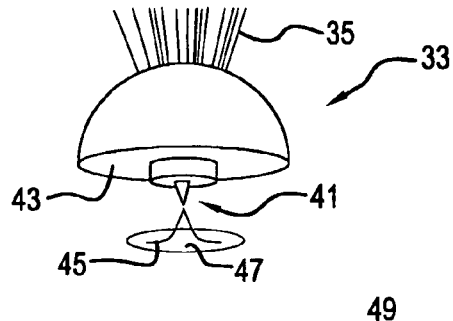
FIG. 4B shows a near-field probe technique using the probe at the base of an SIL.
Figure 4C:
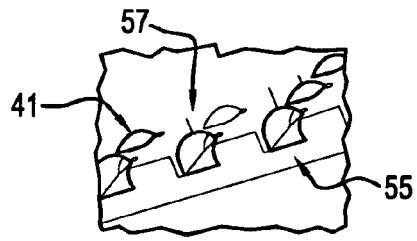
FIG. 4C is a diagram of multiple probes fabricated in combination with a cell well array.

FIG. 4A shows Oceanit's "Cell Tray" 51, described in co-pending Provisional Application Ser. No. 60/421,566 and incorporated herein by reference in its entirety. The cell tray is a cell containment system 51 for holding individual cells 53 stationary in a precise array 55. FIG. 4B shows a near-field probe technique using the probe 41 at the base 43 of the SIL 33. FIG. 4C is a diagram of multiple probes 41 fabricated in combination with a cell well array 55.

Figure 5:
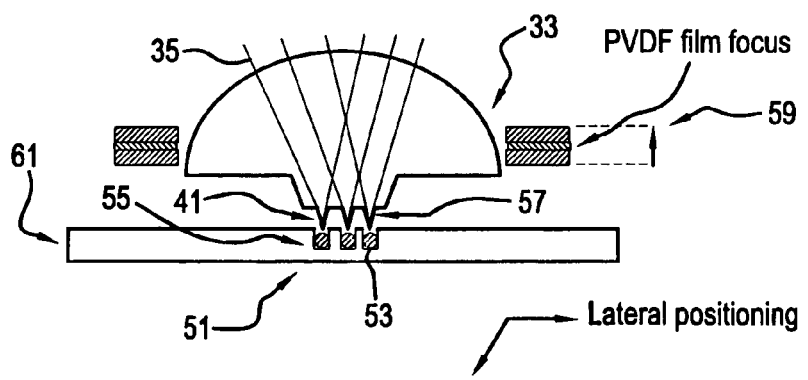
FIG. 5 shows the integrate POINT system including an array of near-field probes.

FIG. 5 shows the integrate POINT system including a probe array 57 of near-field probes 41 for intra-cellular imaging with sub-wavelength resolution imaging and spectroscopy 59 coupled with a precision focus control device and cell containment system 51.

Because of the unique configuration of the POINT system, direct viewing of cells and other biological material is possible. This is not the case with commercially available near-field scanning optical microscopes (NSOM). Until now, near-field probes were designed to move over the surface of the object being measured. The present invention uniquely provides a technique to penetrate the cell membrane with a near-field probe and to image the inside of an intact cell without destroying the cell structure. The POINT platform has many applications, including but not limited to, bio-medical imaging, surface metrology and chemistry at the nanoscale.

The POINT system encompasses an array of near-field probes which may consist of either an array of fiber probes or an array of probes formed at the base of a solid immersion lens for biological imaging which provides greater light throughput. POINT has the capability of simultaneously collecting image data and spectroscopy information in the vicinity of the near-field probes by combining multiple techniques such as fluorescence, Raman, and absorption spectroscopy. Producing a beam diameter only nanometers in size enables spectroscopy to be performed in a very small cross-section. There is an increase in optical efficiency when coupling light through a sub-wavelength aperture using a solid immersion lens.

Forming many probes in an array essentially provides a multiple aperture near-field microscope. This creates a means of analyzing multiple cells at once or multiple image points within a sample. The probe array combined with the Oceanit Cell Tray, which contains a number of cells or other samples in a regular array of "buckets" provides a unique tool for cell analysis.

Using lithography techniques, the near-field microscope is fashioned with an array of probes with precisely the same period in two-dimensions as the cell tray. Multiple cells are then analyzed in an ordered fashion. The invention allows for efficient monitoring of cell activity including, but not limited to, response to drugs, protein content, gene expression, and the like, and enables each cell to be treated differently. The probe array may be built into a computerized stage for certain automated functions. Each cell well of interest can be precisely aligned to the near-field probe array.

This new probe works very well for cell penetration, which is applied as an array of near-field probes in an optical substrate. The geometry of the probe is easily determined from a series of cell poking experiments and light throughput measurements.

The POINT system is not limited to just imaging inside living cells but it is also useful for any application where sub-wavelength resolution is important. Another application of the POINT system is to observe gene expression in cells.

POINT is a near-field microscope imaging system that converts any conventional microscope to have near-field capability. The POINT microscope stage may be installed on most conventional microscopes and may also be transported between microscopes. The new microscope stage has specialized controllers to maneuver the solid immersion lens and control the distance to the sample to sub-wavelength proximity.

This new microscope houses either an array of fiber probes or a solid immersion lens, which accepts a high numerical aperture beam from a high NA objective within a conventional microscope. The solid immersion lens reduces the wavelength in the glass thereby forming a smaller light spot at its internal focus. POINT combines a multiple aperture near-field probe array with the cell tray enabling multiple live cell processing with sub-wavelength resolution imagery and spectroscopy.

The POINT microscope is suitable for imaging living biological samples using a technique that accommodates large-scale production. The POINT near-field microscope platform may be interfaced with most conventional laboratory light microscopes thus making near-field available to a vast research community.

The POINT system may be applied to near field optical microscopy applications as a research tool for medical and biological imaging as well as medical diagnostics as an early warning device for detection of diseased cells and to aid in drug development and treatments. This new POINT technology can be used to transform an existing microscope into a high resolution nanoscope.

While the invention has been described with reference to specific embodiments, modifications and variations of the invention may be constructed without departing from the scope of the invention, which is defined in the following claims.

We claim:

1. Near field imaging apparatus comprising a near-field microscope, and a precision optical probe coupled to the microscopes for non-invasively imaging inside a cell without cell destruction.

2. The apparatus of claim 1, further comprising a confocal guiding microscope with a solid immersion lens with near-field aperture coupled to the microscope and the probe.

3. The apparatus of claim 2, further comprising an illumination source for providing optical energy to the lens.

4. The apparatus of claim 3, wherein the probe is disposed on a base of the lens.

5. The apparatus of claim 4, wherein the optical energy has a focal point halfway through the probe.

6. The apparatus of claim 5, wherein the probe provides a near-field illumination of an inside of the cell.

7. The apparatus of claim 5, further comprising a sample-of-interest containing the cell.

8. The apparatus of claim 7, wherein the sample-of-interest is a biological sample.

9. The apparatus of claim 6, further comprising a cell array comprising a cell containment system, individual cells held stationary in the system, each cell being disposed on a substrate of the cell containment system forming a precise cell array and wherein the cell array is coupled to the probe disposed at the base of the lens.

10. The apparatus of claim 9, wherein the probe further comprises multiple probes forming a probe array.

11. The apparatus of claim 10, wherein the multiple probes of the probe array are coupled to the cells in the cell array.

12. The apparatus of claim 11, further comprising a spectroscope with precision controls coupled to the microscope, the cell and the probe, wherein the probe provides intra-cellular imaging with sub-wavelength resolution imaging of the cell.

13. The apparatus of claim 1, wherein the cell is an intact cell.

14. A method for collecting image data of macro-molecules comprising providing a cell, non-invasively penetrating the cell with a probe, viewing sub-cellular components with the probe, providing information about architecture within the cell, and providing molecular composition of the cell without destroying the cell.

15. The method of claim 14, wherein the viewing comprises viewing molecular processes within the cell and gathering information about the cell.

16. The method of claim 15, wherein the cell is an intact hydrated cell.

17. The method of claim 15, wherein the gathering information comprises capturing signature data of the cell.

18. The method of claim 15, wherein the penetrating comprises determining proximity of the probe to a cell membrane on the cell.

19. The method of claim 18, wherein the penetrating comprises determining shear force on the membrane caused by the probe with a resonance feedback system.

20. The method of claim 19, further comprising continuously monitoring a depth of penetration of the probe with the resonance feedback system and a confocal guiding microscope.

21. The method of claim 20, further comprising imaging the cell with the microscopes, providing 3-D views of an internal environment of the cell, and supporting control of the probe to a nucleus of the cell.

22. The method of claim 21, wherein the imaging further comprises near-field imaging and spectroscopy of sub-cellular and molecular structure of the cell, simultaneously collecting image data and spectroscopy information with the near-field probes by combining fluorescence, Raman spectroscopy, and absorption spectroscopy, and capturing the signature data of the cell.

23. The method of claim 15, wherein the gathering information comprises gathering bio-medical imaging data.

24. The method of claim 15, wherein the gathering information comprises gathering surface metrology data.

25. The method of claim 15, wherein the gathering information comprises gathering nanoscale cell chemistry data.

26. The method of claim 15, wherein the gathering information comprises efficiently monitoring cell activity.

27. The method of claim 26, wherein the monitoring cell activity comprises monitoring activities selected from the group consisting of response to drugs, protein content, gene expression, medical imaging, biological imaging, medical diagnostics, detection and early warning of diseased cells, drug development, treatments, and combinations thereof.

28. The method of claim 26, further comprising treating each cell independently and differently.

29. An imaging system comprising an array of near-field probes having one or more probes, a solid immersion lens, the one or more probes being disposed at a base of the solid immersion lens for providing efficient light throughput and for biological imaging of a cell.

30. The system of claim 29, wherein the one or more probes are fiber probes.

31. The system of claim 29, wherein a beam diameter is produced nanometers in size enabling spectroscopy of a nano cross-section of the cell.

32. The system of claim 29, wherein each probe comprises a sub-wavelength aperture.

33. The system of claim 32, wherein the probe with the sub-wavelength aperture combined with the solid immersion lens increases optical efficiency of light energy coupled therethrough.

34. The system of claim 32, further comprising plural probes in the array forming a multiple aperture near-field microscope for simultaneously analyzing multiple cells or multiple image points within a sample containing the cell.

35. The system of claim 34, further comprising a near-field microscope coupled to the array of probes and the multiple cells disposed in an ordered fashion on a cell tray for simultaneous imaging and analysis of the multiple cells.

36. The system of claim 35, further comprising a computerized stage, wherein the array is coupled to the computerized stage automating functions.

37. The system of claim 36, wherein each of the multiples cells is precisely aligned to a respective probe of the near-field probe array.

38. The system of claim 36, wherein the stage comprises controllers for controlling the solid immersion lens and for controlling a distance of the lens to a sample containing the cell to sub-wavelength proximity.

39. The system of claim 29, wherein the imaging system coupled to a conventional microscope forms a near-field imaging high resolution nanoscope.

40. The system of claim 29, wherein the imaging system is portable between microscopes.

41. The system of claim 39, wherein the microscope coupled to the imaging system houses the array of probes.

42. The system of claim 41, wherein the microscope houses a solid immersion lens.

43. The system of claim 42, wherein the solid immersion lens receives a high numerical aperture beam from a high NA objective within a conventional microscope and reduces a wavelength in glass thereby forming a micron-sized light spot at an internal focus of the lens.

44. The system of claim 43, wherein the array of probes comprises a multiple aperture near-field probe array for imaging and analyzing one or more live cell processing with sub-wavelength resolution imagery and spectroscopy.

45. The system of claim 29, further comprising a sample containing the cell.

46. The system of claim 45, wherein the sample is living biological samples.

47. The system of claim 29, wherein the array provides near field optical microscopy analysis.

48. The system of claim 47, wherein the analysis provided is selected from the group consisting of medical imaging, biological imaging, medical diagnostics, detection and early warning of diseased cells, drug development, treatments, and combinations thereof.

* * * * *